(12) United States Patent
Dasari et al.

(10) Patent No.: US 9,411,695 B2
(45) Date of Patent: Aug. 9, 2016

(54) PROVISIONING MEMORY IN A MEMORY SYSTEM FOR MIRRORING

(71) Applicant: LENOVO ENTERPRISE SOLUTIONS (SINGAPORE) PTE. LTD., Singapore (SG)

(72) Inventors: Shiva R. Dasari, Austin, TX (US); Raghuswamyreddy Gundam, Austin, TX (US); Newton P. Liu, Austin, TX (US); Douglas W. Oliver, Round Rock, TX (US); Mehul M. Shah, Austin, TX (US); Wingcheung Tam, Austin, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 343 days.

(21) Appl. No.: 14/096,246

(22) Filed: Dec. 4, 2013

(65) Prior Publication Data

US 2015/0154082 A1    Jun. 4, 2015

(51) Int. Cl.
G06F 11/16    (2006.01)
G06F 11/20    (2006.01)
G06F 11/34    (2006.01)

(52) U.S. Cl.
CPC ............ *G06F 11/1666* (2013.01); *G06F 11/20* (2013.01); *G06F 11/3409* (2013.01)

(58) Field of Classification Search
None
See application file for complete search history.

(56) References Cited

U.S. PATENT DOCUMENTS

| | | | |
|---|---|---|---|
| 6,055,604 A | 4/2000 | Voigt et al. | |
| 6,993,602 B2 | 1/2006 | Merrill et al. | |
| 7,039,777 B2 | 5/2006 | Yamagami et al. | |
| 7,065,623 B2 | 6/2006 | Chen et al. | |
| 7,065,628 B2 | 6/2006 | Calderon et al. | |
| 8,341,351 B2 | 12/2012 | Tsumura | |
| 8,996,951 B2 * | 3/2015 | Hyde | G06F 11/0703 711/103 |
| 2009/0150721 A1 * | 6/2009 | Kochar | G06F 11/1008 714/6.11 |
| 2011/0154104 A1 * | 6/2011 | Swanson | G06F 11/1666 714/6.23 |
| 2011/0219261 A1 | 9/2011 | Bartlett et al. | |
| 2012/0054543 A1 | 3/2012 | Dreier | |
| 2012/0124415 A1 | 5/2012 | Borkenhagen et al. | |

OTHER PUBLICATIONS

Intel Corporation, "Transforming Mission-Critical Computing", Product Brief, Intel Xeon Processor E7-8800/4800/2800 Product Families, intel.com (online), 4 pages, 2011 [accessed Jun. 4, 2013], URL: http://intel.com/content/dam/doc/product-brief/xeon-e7-transforming-mission-critical-computing-brief.pdf.

* cited by examiner

*Primary Examiner* — Denise Tran
(74) *Attorney, Agent, or Firm* — Edward J. Lenart; Katherine S. Brown; Kennedy Lenart Spraggins LLP

(57) ABSTRACT

Provisioning memory in a memory system for mirroring includes: gathering, by a memory controller, margin data for memory in the memory system, the margin data representing susceptibility for error; identifying, by the memory controller in dependence upon provisioning criteria and the margin data, mirroring candidates within the memory system; and mirroring, by the memory controller, memory of the memory system utilizing the mirroring candidates as a mirrored backup of other memory in the memory system.

20 Claims, 5 Drawing Sheets

PROVISIONING MEMORY IN A MEMORY SYSTEM FOR MIRRORING

BACKGROUND OF THE INVENTION

1. Field of the Invention

The field of the invention is data processing, or, more specifically, methods, apparatus, and memory controllers configured for provisioning memory in a memory system for mirroring.

2. Description of Related Art

In memory systems today, a portion of the total memory may be mirrored in another portion of the total memory so as to provide a backup for failover in case of error. Selection of candidate memory for mirroring, however, is typically hard-coded into a memory controller and is no way dynamic. Consider, for example, a channel of memory with four Dual In-Line Memory Modules (DIMMs). In such an example, a memory controller may be configured so as to use DIMMs 1 and 4 to mirror DIMMs 2 and 3. In such an environment, the quality of the DIMMs is not taken into account. Some DIMMs, due to physical degradation over time, may be of less quality or, said another way, of higher susceptibility of error. Using these DIMMs as primary memory while using other DIMMs with less susceptibility as a mirrored backup may result in more instances of failover due to a higher probability of error in the primary memory.

SUMMARY OF THE INVENTION

Methods, apparatus, and memory controllers configured for provisioning memory in a memory system for mirroring are disclosed in this specification. Such provisioning may include: gathering, by a memory controller, margin data for memory in the memory system, the margin data representing susceptibility for error; identifying, by the memory controller in dependence upon provisioning criteria and the margin data, mirroring candidates within the memory system; and mirroring, by the memory controller, memory of the memory system utilizing the mirroring candidates as a mirrored backup of other memory in the memory system.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
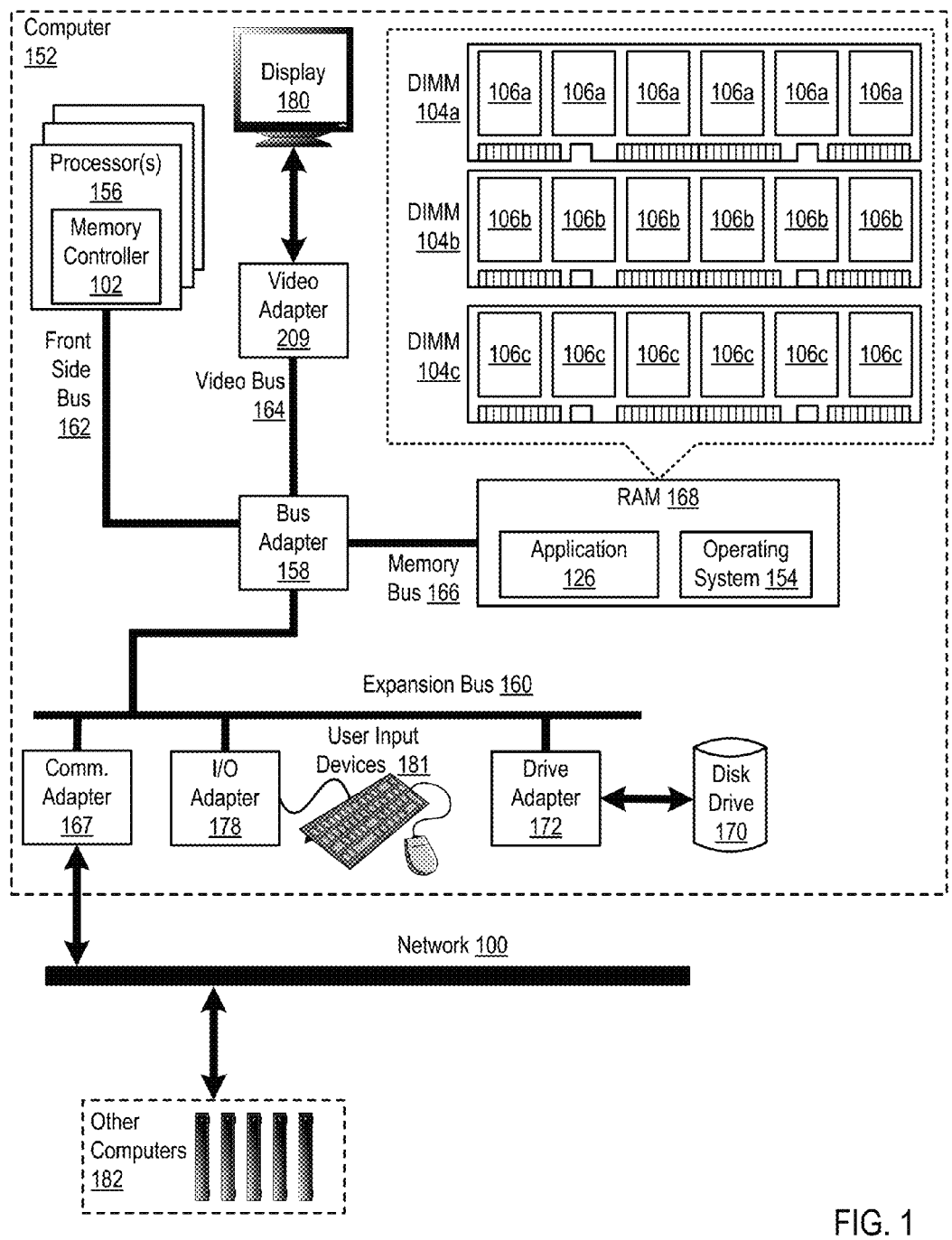
FIG. 1 sets forth a block diagram of a computer system configured for provisioning memory in a memory system for mirroring according to embodiments of the present invention.

Exemplary methods, apparatus, and memory controllers configured for provisioning memory in a memory system for mirroring in accordance with the present invention are described with reference to the accompanying drawings, beginning with FIG. 1. FIG. 1 sets forth a block diagram of a computer system configured for provisioning memory in a memory system for mirroring according to embodiments of the present invention.

The system of FIG. 1 includes an example of automated computing machinery comprising an exemplary computer (152) useful in provisioning memory in a memory system for mirroring according to embodiments of the present invention. The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

Stored in RAM (168) is an application (126), a module of computer program instructions that carries out user-level data processing tasks. Also stored in RAM (168) is an operating system (154). Operating systems useful in computers configured for provisioning memory in a memory system for mirroring according to embodiments of the present invention include UNIX™, Linux™, Microsoft XP™, AIX™, IBM's i5/OS™, and others as will occur to those of skill in the art. The operating system (154) and application (126) in the example of FIG. 1 are shown in RAM (168), but many components of such software typically are stored in non-volatile memory also, such as, for example, on a disk drive (170).

RAM (168), in the example of FIG. 1, includes several Dual In-line Memory Modules (DIMMs) (104a, 104b, 104c). Each DIMM may include memory chips (106a, 106b, 106c). The DIMMs (104) may be configured in one or more channels and the memory chips (106) may be configured in one or more ranks The collection of DIMMs and memory chips in the example of FIG. 1 may be referred to as a memory system.

Provisioning memory for mirroring in the memory system of FIG. 1 in accordance with embodiments of the present invention may be carried out by one or more memory controllers (102). Such a memory controller (102) may gather margin data for memory in the memory system. The margin data represents a particular portion of memory's susceptibility for error. Gathering margin data may be carried out by 'training' the memory. Training the memory may occur at various times including, for example, at startup. During training, memory may be tested and calibrated for various performance characteristics including signal alignment of the RQ (request) and DQ (data) signals as well as eye width parameters for such signals. Other parameters may also be tested or calibrated during training as will occur to readers of skill in the art. Margin data as the term is used here is a collection of results of such tests. The margin data, therefore, generally represents the performance of a particular portion of memory during memory training and, in turn, that portion of memory's susceptibility for error. The more poorly a portion of memory performs during training, the higher the likelihood of error during run time.

Once the margin data is gathered, the memory controller (102) may then identify mirroring candidates within the memory system based on the margin data and provisioning criteria. A mirroring candidate is a portion of memory available to be used for mirroring. Provisioning criteria is a specification of an amount of memory to be mirrored. The specification may be described in terms of memory space, in terms of a number of ranks, DIMMs, channels, or so on. In a memory system comprising four DIMMs, each of 4 GB (Gigabytes) in size, for example, the provisioning criteria may specify that 4 GB be mirrored. In such an example, the memory controller (102) may identify 4 GB of memory candidates as the 4 GB of the memory system most susceptible to error based on the margin data. In some embodiments logical and physical groupings such as channels, ranks, and DIMMs may be taken into account as well in identifying the mirroring candidates. For example, if one of the four DIMMs in the memory system is the most susceptible DIMM in the system relative to other DIMMs, but particular ranks in other DIMMs are actually are more susceptible, the memory controller (102) may be configured to select the DIMM being the most susceptible to error as the mirroring candidate.

Once the mirroring candidates are identified, the memory controller (102) may mirror memory of the memory system utilizing the identified mirroring candidates as a mirrored backup of other memory in the memory system. In this way, rather than being hardcoded to select particular portions of memory as mirrored backups regardless of the quality of the memory as in prior art memory systems, the memory controller (102) of FIG. 1 may intelligently identify and portions of memory most susceptible to errors as a mirrored backup. As a result, the memory system has a lower probability of failover in that the primary memory is less likely to produce an error than the mirrored backup.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for provisioning memory in a memory system for mirroring according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for provisioning memory in a memory system for mirroring according to embodiments of the present invention include modems for wired dial-up communications, Ethernet (IEEE 802.3) adapters for wired data communications, and 802.11 adapters for wireless data communications.

The arrangement of computers, DIMMs, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
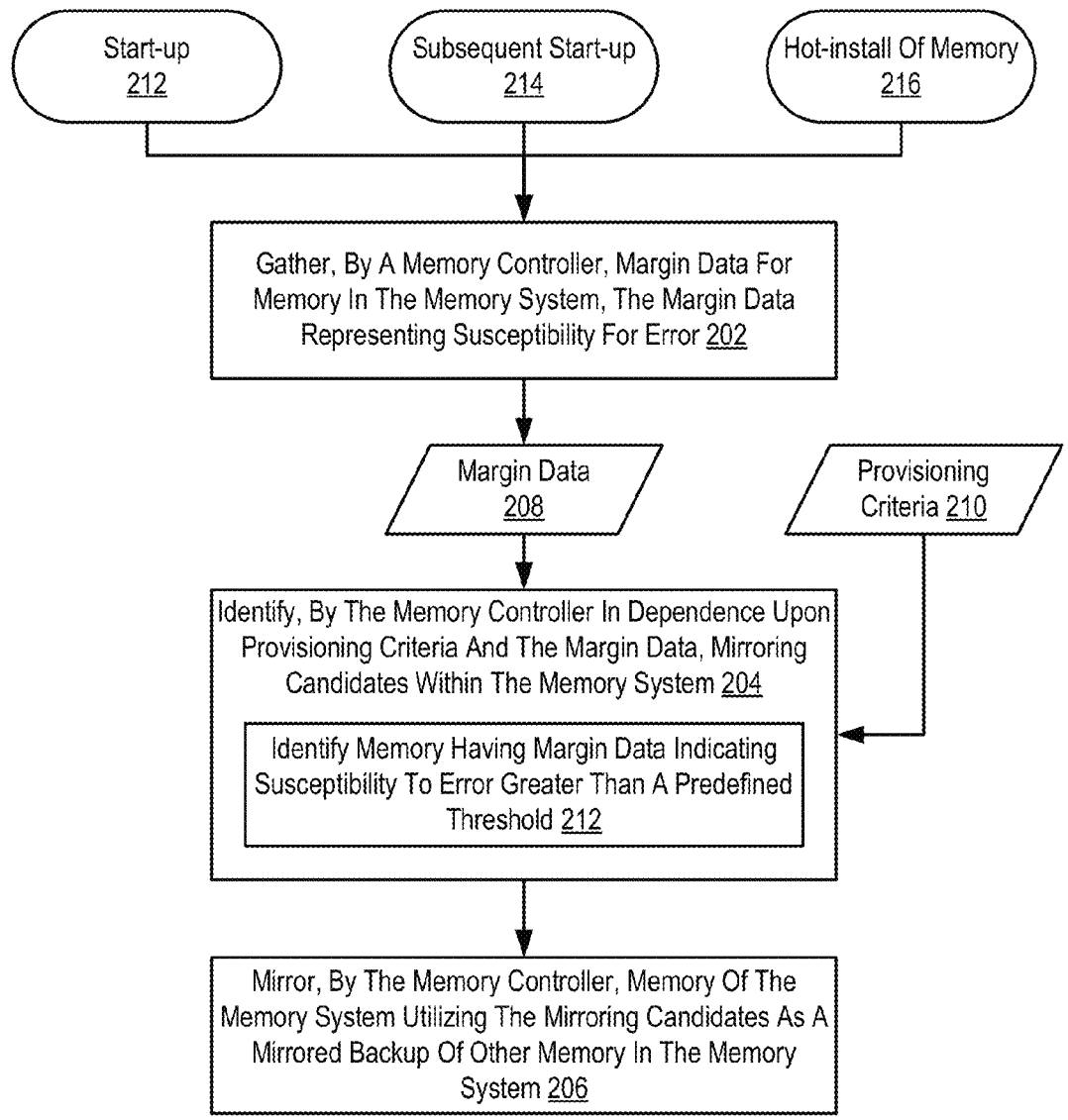
FIG. 2 sets forth a flow chart illustrating an exemplary method for provisioning memory in a memory system for mirroring according to embodiments of the present invention.

For further explanation, FIG. 2 sets forth a flow chart illustrating an exemplary method for provisioning memory in a memory system for mirroring according to embodiments of the present invention. The method of FIG. 2 may be carried out at various times during computer operation. To that end, the method of FIG. 2 may begin during start-up (212) of a computer system that includes memory controller and memory system. Carrying out memory provisioning in accordance with embodiments of the present invention at start-up refers to an initial, that is a first, time the method of FIG. 2 is executed for a particular memory system. Over time, however, physical degradation of DIMMs may occur even in environments where the DIMMs are not physically removed and re-inserted. To that end, the method of FIG. 2 may be carried out on a subsequent start-up (214) of the computer system. That is, even without a change in architecture of the memory subsystem, memory's susceptibility to error may change over time. The method of FIG. 2 may also be carried out responsive to a hot-install (216) of memory in the memory system. That is, when a DIMM is inserted into a slot in a hot-install, a memory controller may carry out the method of FIG. 2 to, effectively, re-provision the memory for mirroring with to account for the change in memory system architecture.

The method of FIG. 2 includes gathering (202), by a memory controller, margin data (208) for memory in the memory system. The margin data (208) represents susceptibility for error of a portion of memory. As explained above, gathering (202) margin data (208) may be carried out by training the memory of the memory system. That is the margin data (208) may represent the results of calibrating for signal alignment, testing for eye width parameters, and so on.

The method of FIG. 2 also includes identifying (204), by the memory controller in dependence upon provisioning criteria (210) and the margin data (208), mirroring candidates within the memory system. In some embodiments, the margin data may be expressed as a numerical value. In such embodiments, identifying (204) mirroring candidates within the memory system may be carried out by identifying (212) memory having margin data indicating susceptibility to error greater than a predefined threshold.

The method of FIG. 2 also includes mirroring (206), by the memory controller, memory of the memory system utilizing the mirroring candidates as a mirrored backup of other memory in the memory system. Mirroring (206) memory of the memory system utilizing the mirroring candidates as a mirrored backup of other memory in the memory system may be carried out by directing writes to particular portion of memory that is mirrored in a mirrored backup to both the particular portion of memory and the mirrored backup memory.

Figure 3:
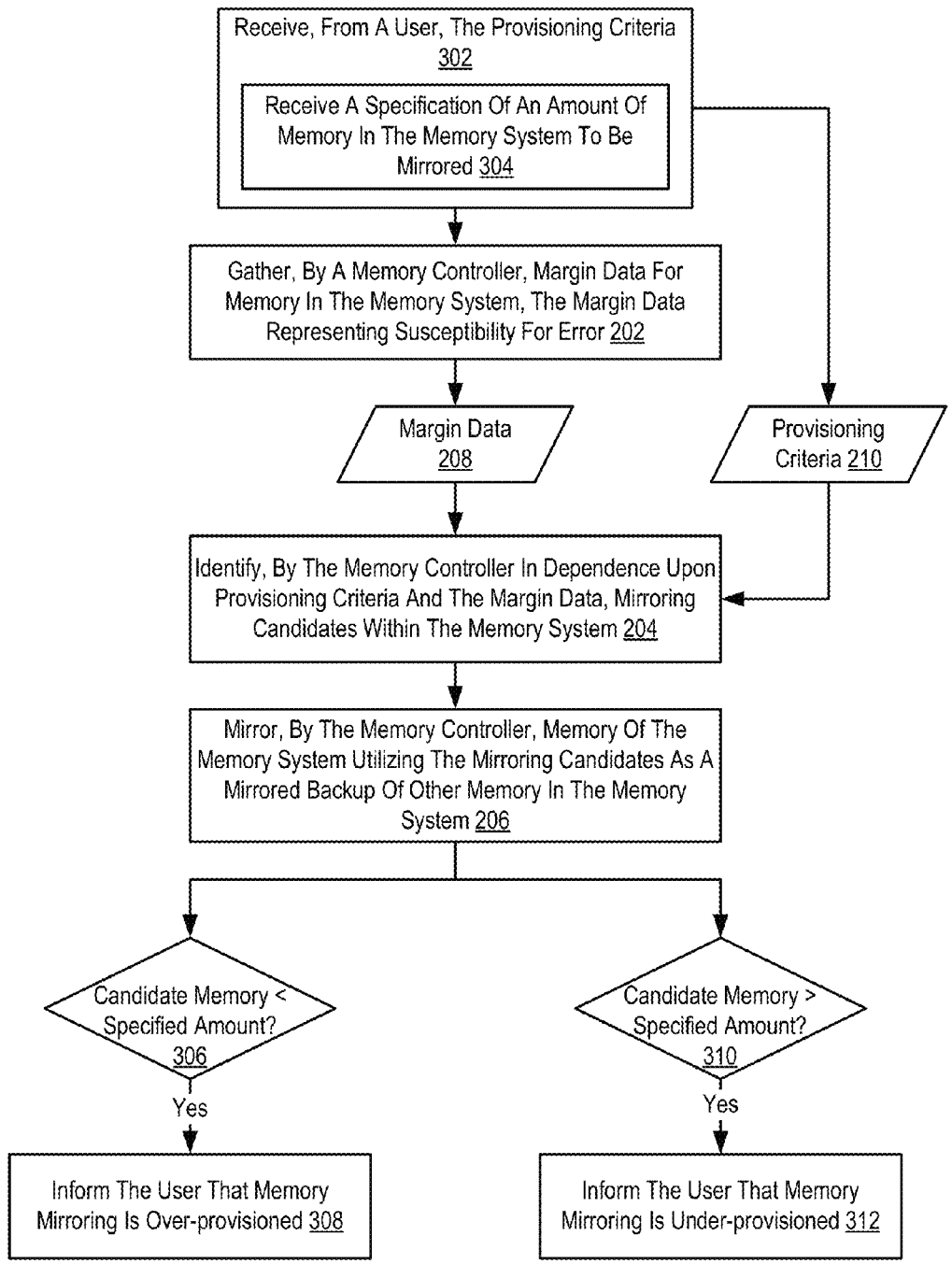
FIG. 3 sets forth a flow chart illustrating a further exemplary method for provisioning memory in a memory system for mirroring according to embodiments of the present invention.

For further explanation, FIG. 3 sets forth a flow chart illustrating a further exemplary method for provisioning memory in a memory system for mirroring according to embodiments of the present invention. The method of FIG. 3 is similar to the method of FIG. 2 in that the method of FIG. 3 also includes gathering (202) margin data (208) for memory in the memory system, identifying (204) mirroring candidates within the memory system, and mirroring (206) memory of the memory system utilizing the mirroring candidates as a mirrored backup of other memory in the memory system.

The method of FIG. 3 differs from the method of FIG. 2, however, in that receiving (302), from a user, the provisioning criteria. In the method of FIG. 3, receiving (302) the provisioning criteria from a user may include receiving (304) a specification of an amount of memory in the memory system to be mirrored. A user may be provided a graphical user interface (GUI) that enables a user to provide input specifying an amount of memory to be mirrored. Other parameters may also be available to the user to specify as well.

After identifying (204) mirroring candidates and mirroring (206) memory utilizing the mirroring candidates the method of FIG. 3 continues by determining (306), by the memory controller, whether the identified mirroring candidates comprise an amount of memory less than the specified amount of memory to be mirrored. Consider, for example, that a user specifies 4 GB of memory to be mirrored in a 16 GB memory system. Consider also that the memory controller identifies all mirroring candidates having margin data that exceeds a particular threshold and the total memory of those mirroring candidates is 2 GB. In such an example, provisioning 4 GB of memory may be effectively wasteful in that 2 GB of the 4 GB of mirrored backups is unlikely to fail. In such an example, the method of FIG. 3 continues by informing (308) the user that memory mirroring is over-provisioned. The user, then, may at a subsequent startup specify a lesser amount of memory to be mirrored.

The method of FIG. 3 also includes determining (310) whether the identified mirroring candidates comprise an amount of memory greater than the specified amount of memory to be mirrored. Consider, for example, that a user specifies 4 GB of memory to be mirrored in a 16 GB memory system. Consider also that the memory controller identifies all mirroring candidates having margin data that exceeds a particular threshold and the total memory of those mirroring candidates is 6 GB. In such an example, provisioning only 4 GB provides a higher probability of failure as 2 GB of memory not set aside as a mirrored backup is in use as a primary memory and such memory has been identified as memory having a higher susceptibility to error. In such an example, the method of FIG. 3 includes informing (312) the user that memory mirroring is under-provisioned. At a subsequent start-up, the user may specify a greater amount of memory to provision for memory mirroring.

The user may be informed (308, 312) in various ways, such as, for example via a GUI. It should also be noted that the determinations (306, 308) may be based on a tolerance. Consider, for example, that a user specifies 4 GB of memory be mirrored in a 16 GB memory system. Consider also that the memory controller identifies (204) mirroring candidates totaling 3.97 GB of memory. Rather than informing (308) the user that the memory is over-provisioned, the memory controller may be configured to provide such information (308) only if the amount of memory of the memory candidates is less than the specified amount by a predefined threshold tolerance. The same may be applied in the case of under-provisioning.

Figure 4:
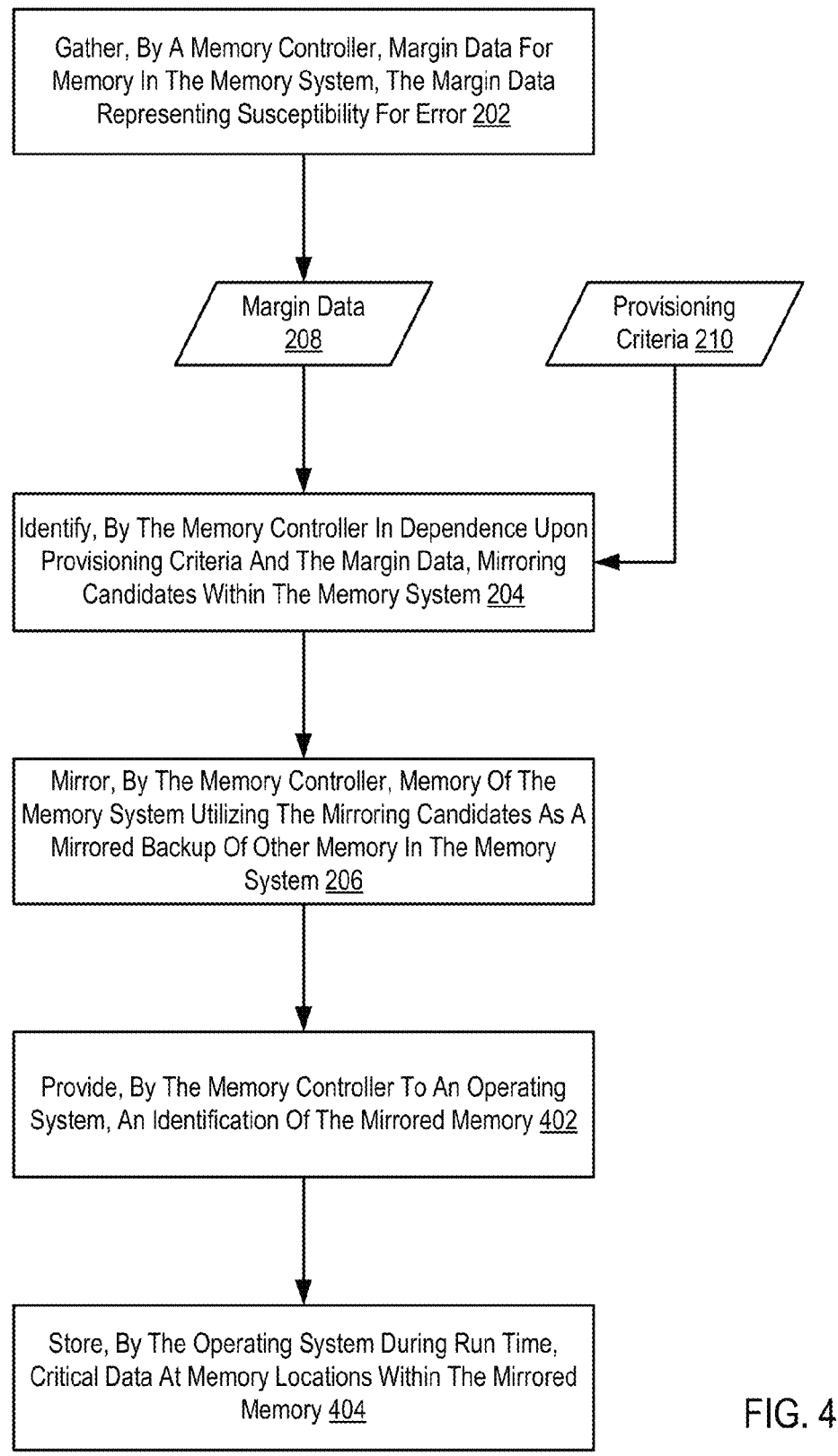
FIG. 4 sets forth a flow chart illustrating a further exemplary method for provisioning memory in a memory system for mirroring according to embodiments of the present invention.

For further explanation, FIG. 4 sets forth a flow chart illustrating a further exemplary method for provisioning memory in a memory system for mirroring according to embodiments of the present invention. The method of FIG. 4 is similar to the method of FIG. 2 in that the method of FIG. 4 also includes gathering (202) margin data (208) for memory in the memory system, identifying (204) mirroring candidates within the memory system, and mirroring (206) memory of the memory system utilizing the mirroring candidates as a mirrored backup of other memory in the memory system.

The method of FIG. 4 differs from the method of FIG. 2, however, in that the method of FIG. 4 includes providing (402), by the memory controller to an operating system, an identification of the mirrored memory. Providing an identification of the mirrored memory may be carried out in various ways, including, for example by providing the physical addresses of memory location that has a mirrored backup.

The method of FIG. 4 continues by storing (404), by the operating system during run time, critical data at memory locations within the mirrored memory. Utilizing the identification of the memory being mirrored in the mirrored backup, the operating system may utilize that memory to store critical data, such as software code and the like. In this way, the operating system may provide memory redundancy for critical data.

Figure 5:
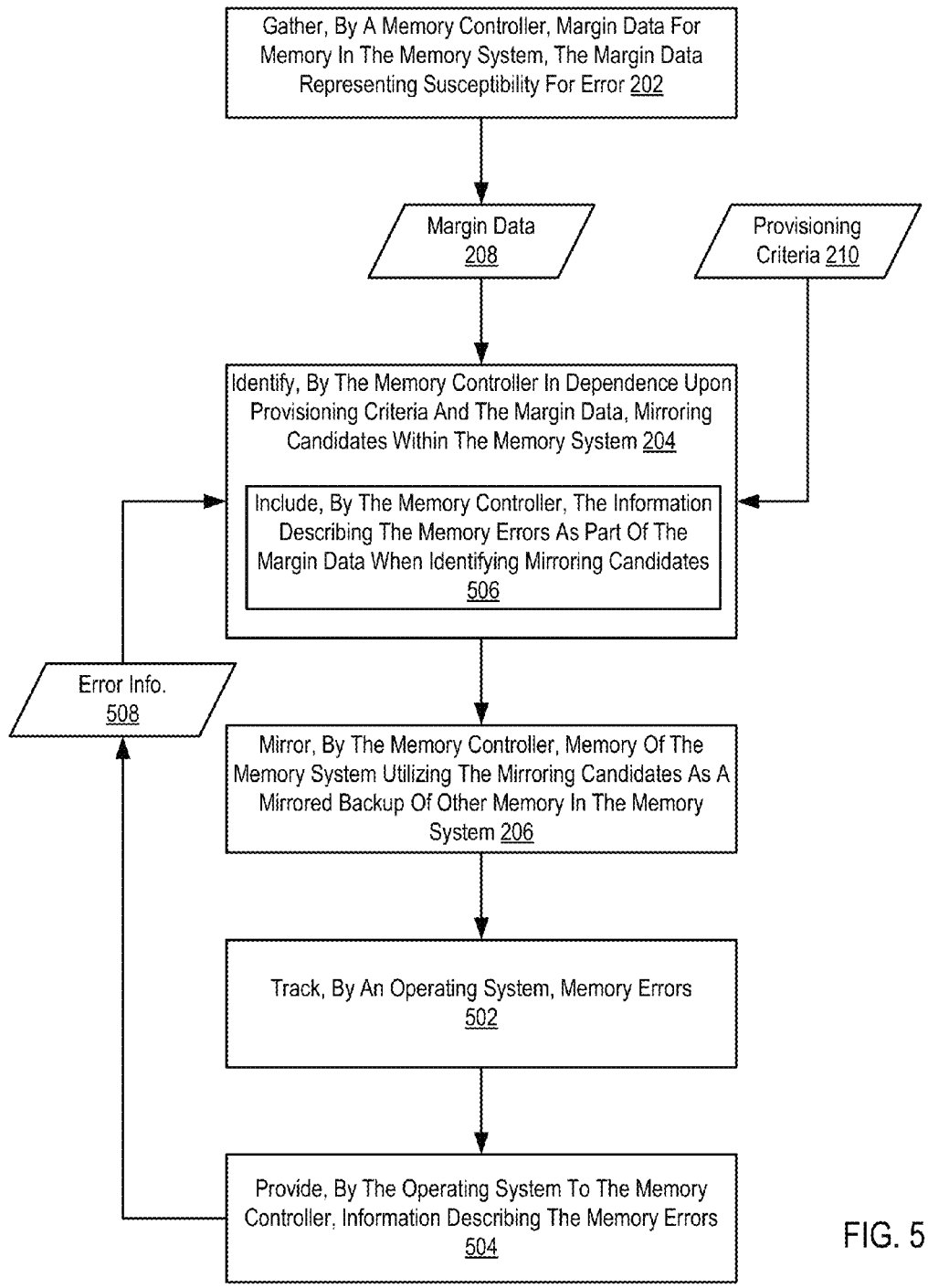
FIG. 5 sets forth a flow chart illustrating a further exemplary method for provisioning memory in a memory system for mirroring according to embodiments of the present invention.

For further explanation, FIG. 5 sets forth a flow chart illustrating a further exemplary method for provisioning memory in a memory system for mirroring according to embodiments of the present invention. The method of FIG. 5 is similar to the method of FIG. 2 in that the method of FIG. 5 also includes gathering (202) margin data (208) for memory in the memory system, identifying (204) mirroring candidates within the memory system, and mirroring (206) memory of the memory system utilizing the mirroring candidates as a mirrored backup of other memory in the memory system.

The method of FIG. 5 differs from the method of FIG. 2, however, in that the method of FIG. 5 includes tracking (502), by an operating system, memory errors. Operating systems may collect error information over time regarding reads and writes to memory locations. The operating system in the example of FIG. 5 may track such information over time.

The method of FIG. 5 also includes providing (504), by the operating system to the memory controller, information (508) describing the memory errors. providing (504) information describing the memory errors may be carried out in various ways including storing in a memory location well-known to the memory controller, such a register, a data structure that includes data describing memory errors and the identification of memory addresses associated with the memory errors.

When identifying (506) mirroring candidates, the memory controller in the method of FIG. 5 may include (506) the information describing the memory errors as part of the margin data. That is, the information (508) describing memory errors provided by the operating system may be utilized by the memory controller, along with the gathered (202) margin data, in identifying (204) mirroring candidates.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of provisioning memory in a memory system for mirroring, the method comprising:
    gathering, by a memory controller located in a computer processor operatively connected to the memory system, margin data for memory in the memory system, the margin data representing susceptibility for error;
    identifying, by the memory controller in dependence upon provisioning criteria and the margin data, mirroring candidates within the memory system, wherein the mirroring candidates have the greatest susceptibility to error; and mirroring, by the memory controller, memory of the memory system utilizing the mirroring candidates as a mirrored backup of other memory in the memory system.

2. The method of claim 1 wherein:
the margin data is expressed as a numerical value; and
identifying mirroring candidates within the memory system further comprises identifying memory having margin data indicating susceptibility to error greater than a predefined threshold.

3. The method of claim 1 further comprising:
receiving, from a user, the provisioning criteria, including receiving a specification an amount of memory in the memory system to be mirrored.

4. The method of claim 1 further comprising:
determining, by the memory controller, whether the identified mirroring candidates comprise an amount of memory less than the specified amount of memory to be mirrored;
if the identified mirroring candidates comprise an amount of memory less than the specified amount of memory to be mirrored, informing the user that memory mirroring is over-provisioned;
determining whether the identified mirroring candidates comprise an amount of memory greater than the specified amount of memory to be mirrored; and
if the identified mirroring candidates comprise an amount of memory greater than the specified amount of memory to be mirrored, informing the user that memory mirroring is under-provisioned.

5. The method of claim 1 further comprising:
providing, by the memory controller to an operating system, an identification of the mirrored memory; and
storing, by the operating system during run time, critical data at memory locations within the mirrored memory.

6. The method of claim 1 further comprising:
tracking, by an operating system, memory errors;
providing, by the operating system to the memory controller, information describing the memory errors;
including, by the memory controller, the information describing the memory errors as part of the margin data when identifying mirroring candidates.

7. The method of claim 1 wherein gathering the margin data, identifying mirroring candidates, and mirroring memory utilizing the mirroring candidates is carried out during startup.

8. The method of claim 7 wherein gathering the margin data, identifying mirroring candidates, and mirroring memory utilizing the mirroring candidates is carried out again during a subsequent startup.

9. The method of claim 1 wherein gathering the margin data, identifying mirroring candidates, and mirroring memory utilizing the mirroring candidates is carried out responsive to a hot-install of memory in the memory system.

10. An apparatus for provisioning memory in a memory system for mirroring, the apparatus comprising a computer processor, a computer memory operatively coupled to the computer processor, the computer memory having disposed within it computer program instructions that, when executed by the computer processor, cause the apparatus to carry out the steps of:
gathering, by a memory controller, margin data for memory in the memory system, the margin data representing susceptibility for error;
identifying, by the memory controller in dependence upon provisioning criteria and the margin data, mirroring candidates within the memory system, wherein the mirroring candidates have the greatest susceptibility to error; and
mirroring, by the memory controller, memory of the memory system utilizing the mirroring candidates as a mirrored backup of other memory in the memory system.

11. The apparatus of claim 10 wherein:
the margin data is expressed as a numerical value; and
identifying mirroring candidates within the memory system further comprises identifying memory having margin data indicating susceptibility to error greater than a predefined threshold.

12. The apparatus of claim 10 further comprising computer program instructions that, when executed by the computer processor, cause the apparatus to carry out the step of:
receiving, from a user, the provisioning criteria, including receiving a specification an amount of memory in the memory system to be mirrored.

13. The apparatus of claim 10 further comprising computer program instructions that, when executed by the computer processor, cause the apparatus to carry out the step of:
determining, by the memory controller, whether the identified mirroring candidates comprise an amount of memory less than the specified amount of memory to be mirrored;
if the identified mirroring candidates comprise an amount of memory less than the specified amount of memory to be mirrored, informing the user that memory mirroring is over-provisioned;
determining whether the identified mirroring candidates comprise an amount of memory greater than the specified amount of memory to be mirrored; and
if the identified mirroring candidates comprise an amount of memory greater than the specified amount of memory to be mirrored, informing the user that memory mirroring is under-provisioned.

14. The apparatus of claim 10 further comprising computer program instructions that, when executed by the computer processor, cause the apparatus to carry out the step of:
providing, by the memory controller to an operating system, an identification of the mirrored memory; and
storing, by the operating system during run time, critical data at memory locations within the mirrored memory.

15. The apparatus of claim 10 further comprising computer program instructions that, when executed by the computer processor, cause the apparatus to carry out the step of:
tracking, by an operating system, memory errors;
providing, by the operating system to the memory controller, information describing the memory errors;
including, by the memory controller, the information describing the memory errors as part of the margin data when identifying mirroring candidates.

16. The apparatus of claim 10 wherein gathering the margin data, identifying mirroring candidates, and mirroring memory utilizing the mirroring candidates is carried out during startup.

17. The apparatus of claim 10 wherein gathering the margin data, identifying mirroring candidates, and mirroring memory utilizing the mirroring candidates is carried out again during a subsequent startup.

18. The apparatus of claim 10 wherein gathering the margin data, identifying mirroring candidates, and mirroring memory utilizing the mirroring candidates is carried out responsive to a hot-install of memory in the memory system.

19. A memory controller configured for provisioning memory in a memory system for mirroring, a computer memory operatively coupled to the memory controller, the computer memory having disposed within it computer program instructions that, executed by a processor, cause the memory controller to carry out the steps of:
- gathering, by the memory controller located in a computer processor operatively connected to the memory system, margin data for memory in the memory system, the margin data representing susceptibility for error;
- identifying, by the memory controller in dependence upon provisioning criteria and the margin data, mirroring candidates within the memory system, wherein the mirroring candidates have the greatest susceptibility to error; and
- mirroring, by the memory controller, memory of the memory system utilizing the mirroring candidates as a mirrored backup of other memory in the memory system.

20. The memory controller of claim 19 wherein:
the margin data is expressed as a numerical value; and
further comprising computer program instructions that, by the processor, cause the memory controller to carry out the step of:
identifying mirroring candidates within the memory system further comprises identifying memory having margin data indicating susceptibility to error greater than a predefined threshold.

* * * * *